US008411138B2

(12) United States Patent
Tsuda et al.

(10) Patent No.: US 8,411,138 B2

(45) Date of Patent: Apr. 2, 2013

(54) CAMERA HEAD SEPARATED TYPE CAMERA DEVICE

(75) Inventors: Takashi Tsuda, Oume (JP); Hiroshi Shinozaki, Oume (JP); Masatoshi Ookubo, Iruma (JP); Kei Tashiro, Oume (JP); Hiroyuki Irikura, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 317 days.

(21) Appl. No.: 12/787,157

(22) Filed: May 25, 2010

(65) Prior Publication Data

US 2011/0025907 A1 Feb. 3, 2011

(30) Foreign Application Priority Data

Jul. 31, 2009 (JP) ................................ P2009-179526

(51) Int. Cl.
*H04N 7/18* (2006.01)

(52) U.S. Cl. ........................................... 348/65; 348/76

(58) Field of Classification Search ............. 348/65–72, 348/82, 222, 207, 552

See application file for complete search history.

(56) References Cited

U.S. PATENT DOCUMENTS 8,040,374 B2 * 10/2011 Ookubo et al. ................. 348/82
2006/0013291 A1 1/2006 Hashimoto et al.
2008/0183119 A1 7/2008 Joshi

FOREIGN PATENT DOCUMENTS

JP 5-115030 5/1993
JP 7-074995 3/1995
JP 8-317251 11/1996
JP 2000-181591 6/2000
JP 2000-341177 12/2000
JP 2001-157123 6/2001
JP 2001-339315 12/2001
JP 2004-048360 2/2004
JP 2005-191800 7/2005
JP 2005-311535 11/2005
JP 2006-024972 1/2006
JP 2006-203292 8/2006
JP 2008-183119 8/2008

OTHER PUBLICATIONS

Japanese Patent Application No. 2009-179526; Notice of Reasons for Rejection; Mailed Jun. 22, 2010 (English translation).
Japanese Patent Application No. 2009-179526; Notice of Reasons for Rejection; Mailed Nov. 24, 2010 (English translation).
Japanese Patent Application No. 2009-179526; Notice of Reasons for Rejection; Mailed Apr. 5, 2011 (English translation).
Japanese Patent Application No. 2011-167559; Notice of Reasons for Rejection; Mailed Aug. 30, 2011 (English translation).

* cited by examiner

*Primary Examiner* — Andy Rao
(74) *Attorney, Agent, or Firm* — Blakely, Sokoloff, Taylor & Zafman LLP

(57) ABSTRACT

According to an aspect of the present invention, there is provided a camera head separated type camera device including: a camera head; a camera control unit; and a cable connecting the camera head and the camera control unit with each other, wherein the camera control unit includes: a control portion which feeds a predetermined DC (Direct Current) voltage to the camera head, and wherein the camera head includes: an LVDS conversion driver portion which transmits an LVDS (Low Voltage Differential Signaling) signal to the camera control unit; a correction control portion which outputs a correction value for the LVDS signal; and an LVDS control portion which controls the LVDS conversion driver portion based on the correction value.

10 Claims, 12 Drawing Sheets

1
CAMERA HEAD
2
3
IMAGE PICKUP ELEMENT
4
LVDS CONVERSION DRIVER
5
LVDS CONTROL PORTION
17
CORRECTION VALUE
6
CORRECTION CONTROL PORTION
7
VOLTAGE MEASURING PORTION
8
STORAGE PORTION
15
CAMERA CABLE
15
9
CCU
10
LVDS RECEIVER
11
SIGNAL PROCESSING PORTION
12
OUTPUT CIRCUIT
13
14
CONTROL PORTION

| VOLTAGE DROP | AMPLITUDE CORRECTION VALUE | RISING CORRECTION VALUE |
|---|---|---|
| V1 | A1 | E1 |
| V2 | A2 | E2 |
| V3 | A3 | E3 |
| V4 | A4 | E4 |
| ⋮ | ⋮ | ⋮ |
| Vn−3 | An−3 | En−3 |
| Vn−2 | An−2 | En−2 |
| Vn−1 | An−1 | En−1 |
| Vn | An | En |

20
CAMERA HEAD
21
3
IMAGE PICKUP ELEMENT
4
LVDS CONVERSION DRIVER
5
LVDS CONTROL PORTION
27
CORRECTION VALUE
22
CORRECTION CONTROL PORTION
23
STORAGE PORTION
15
CAMERA CABLE
15
24
CPU
10
LVDS RECEIVER
11
SIGNAL PROCESSING PORTION
12
OUTPUT CIRCUIT
13
25
CONTROL PORTION
26
VOLTAGE MEASURING PORTION

| VOLTAGE DROP | AMPLITUDE CORRECTION VALUE | RISING CORRECTION VALUE |
|---|---|---|
| Vs1 | As1 | Es1 |
| Vs2 | As2 | Es2 |
| Vs3 | As3 | Es3 |
| Vs4 | As4 | Es4 |
| ⋮ | ⋮ | ⋮ |
| Vsn−3 | Asn−3 | Esn−3 |
| Vsn−2 | Asn−2 | Esn−2 |
| Vsn−1 | Asn−1 | Esn−1 |
| Vsn | Asn | Esn |

30
35
CPU
12
OUTPUT CIRCUIT
11
SIGNAL PROCESSING PORTION
13
36
CONTROL PORTION
10
LVDS RECEIVER
37
CAMERA CABLE
31
CAMERA HEAD
3
IMAGE PICKUP ELEMENT
4
LVDS CONVERSION DRIVER
5
LVDS CONTROL PORTION
33
STORAGE PORTION
38
CORRECTION VALUE
32
CORRECTION CONTROL PORTION
34
SWITCH

| SWITCH SETTING VALUE | AMPLITUDE CORRECTION VALUE | RISING CORRECTION VALUE |
|---|---|---|
| SW1 | Asw1 | Esw1 |
| SW2 | Asw2 | Esw2 |
| SW3 | Asw3 | Esw3 |
| SW4 | Asw4 | Esw4 |
| ⋮ | ⋮ | ⋮ |
| SWn-3 | Aswn-3 | Eswn-3 |
| SWn-2 | Aswn-2 | Eswn-2 |
| SWn-1 | Aswn-1 | Eswn-1 |
| SWn | Aswn | Eswn |

40
41
CAMERA HEAD
3
IMAGE PICKUP ELEMENT
4
LVDS CONVERSION DRIVER
5
LVDS CONTROL PORTION
49
CORRECTION VALUE
42
CORRECTION CONTROL PORTION
43
STORAGE PORTION
48
CAMERA CABLE
48
44
CPU
10
LVDS RECEIVER
11
SIGNAL PROCESSING PORTION
12
OUTPUT CIRCUIT
13
45
CONTROL PORTION
46
SWITCH
12
DISPLAY DEVICE

| SWITCH SETTING VALUE | AMPLITUDE CORRECTION VALUE | RISING CORRECTION VALUE |
|---|---|---|
| SWc1 | Aswc1 | Eswc1 |
| SWc2 | Aswc2 | Eswc2 |
| SWc3 | Aswc3 | Eswc3 |
| SWc4 | Aswc4 | Eswc4 |
| ⋮ | ⋮ | ⋮ |
| SWcn−3 | Aswcn−3 | Eswcn−3 |
| SWcn−2 | Aswcn−2 | Eswcn−2 |
| SWcn−1 | Aswcn−1 | Eswcn−1 |
| SWcn | Aswcn | Eswcn |

CAMERA HEAD SEPARATED TYPE CAMERA DEVICE

CROSS-REFERENCE TO RELATED APPLICATIONS

This application is based upon and claims the benefit of priority from Japanese Patent Application No. 2009-179526, filed on Jul. 31, 2009, the entire contents of which are incorporated herein by reference.

BACKGROUND

1. Field

An aspect of the present invention relates to a camera head separated type camera device which has a camera head separated from a camera control unit for controlling the camera head.

2. Description of the Related Art

There is know a camera head separated type camera in which a camera head having an image pickup element such as a CMOS is detachably attached to a camera control unit (hereinafter referred to as CCU) for controlling the operation of the camera head through a camera cable. For example, such camera is used as an endoscope for medical or industrial use.

In such camera device, a video signal obtained from the image pickup element in the camera head is fed to the CCU through a dedicated cable. In recent years, the video signal is digital-transmitted as an LVDS (Low Voltage Differential Signaling) signal with advance of high resolution and high speed. It is said that LVDS enables signal processing with high speed transmission, small signal amplitude, low power consumption and little electromagnetic interference.

When the transmission distance of the digital video signal from the camera head to the CCU becomes long, it is difficult to transmit a digital video signal correctly. In view of this difficulty, there has been proposed a technique in which frequency characteristic of a digital video signal to be transmitted to a transmission target via a prearranged transmission line is corrected in advance so that degradation of the frequency characteristic of the digital video signal via the transmission line can be compensated based on the signal level of a reference signal transmitted via the transmission line (e.g. see JP-H08-317251-A).

When the cable length is long at the time of transmission of a LVDS video signal from the camera head to the CCU, the amplitude of the differential signal is lowered because of a voltage drop due to the internal resistance of the cable, and the rising time and the falling time of the differential signal are elongated because of the frequency characteristic of the video signal. As a result, a data reproducing condition of the CCU may not be satisfied so that accurate information transmission cannot be performed.

FIG. 13 illustrates the example waveform of an LVDS signal. When pulses of the LVDS signal continue with a constant rising (falling) time and a constant voltage, a good quality waveform called "eye open" in an eye mask 60 can be obtained.

FIG. 14 illustrates the example waveform of a poor quality LVDS signal. As the cable length becomes long, the voltage amplitude of the differential signal becomes low and the high frequency component of data due to the frequency characteristic is attenuated, that is, the rising (falling) time of data becomes so long that the waveform invades the eye mask 60, resulting in "eye close".

BRIEF DESCRIPTION OF THE DRAWINGS

A general architecture that implements the various feature of the present invention will now be described with reference to the drawings. The drawings and the associated descriptions are provided to illustrate embodiments of the present invention and not to limit the scope of the present invention.

FIG. 4 illustrates an example table of the relation between a voltage drop and each correction value.

FIG. 7 illustrates an example table of the relation between a voltage drop and each correction value in Embodiment 2.

FIG. 10 illustrates an example table of the relation between a switch setting value and each correction value in Embodiment 3.

DETAILED DESCRIPTION

Various embodiments according to the present invention will be described hereinafter with reference to the accompanying drawings. In general, according to one embodiment of the present invention, there is provided a camera head separated type camera device including: a camera head; a camera control unit; and a cable connecting the camera head and the camera control unit with each other, wherein the camera control unit includes: a control portion which feeds a predetermined DC (Direct Current) voltage to the camera head, and wherein the camera head includes: an LVDS conversion driver portion which transmits an LVDS (Low Voltage Differential Signaling) signal to the camera control unit; a correction control portion which outputs a correction value for the LVDS signal; and an LVDS control portion which controls the LVDS conversion driver portion based on the correction value.

Embodiments of the invention will be described below with reference to the drawings.

[Embodiment 1]

Figure 1:
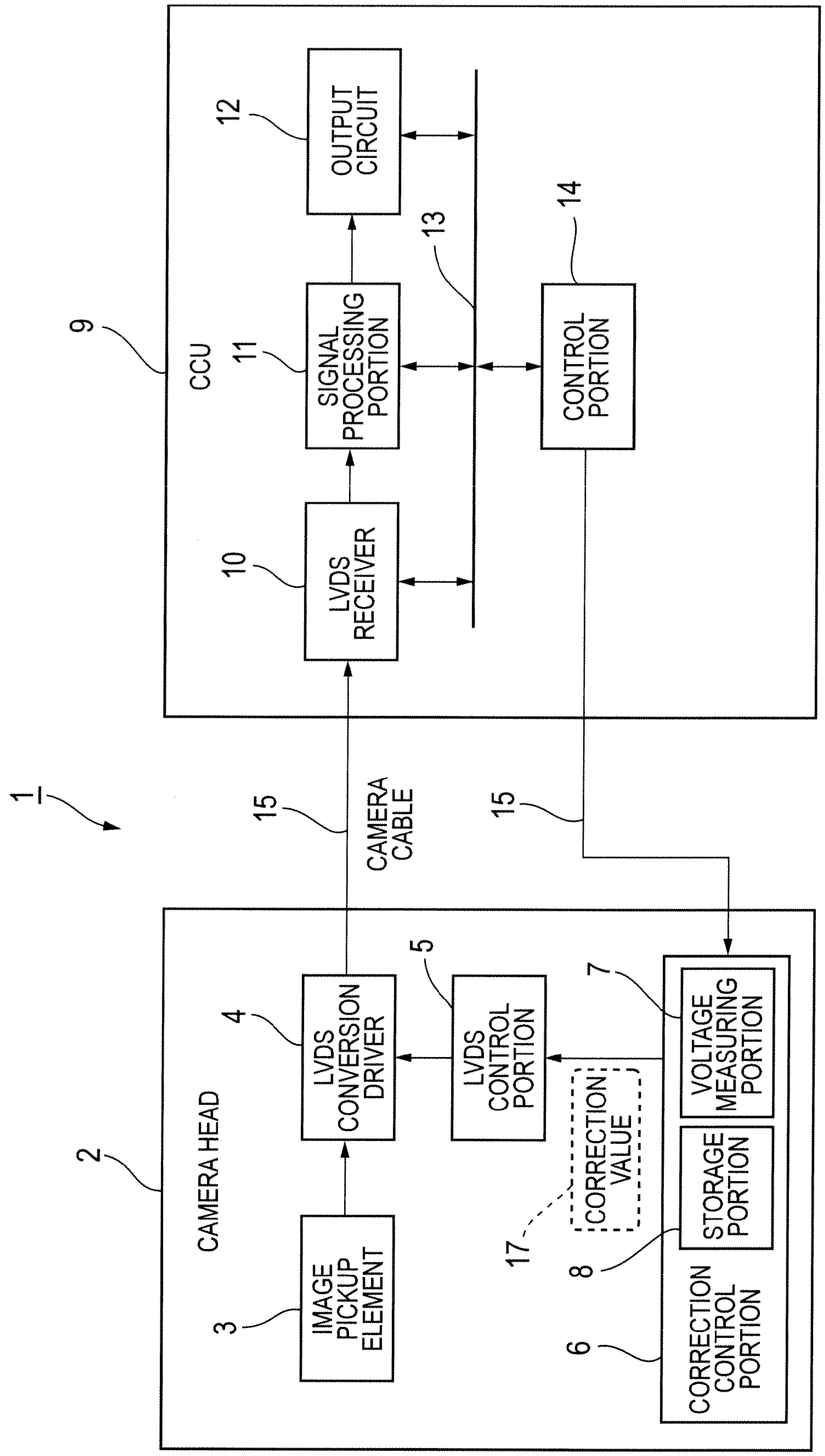
FIG. 1 illustrates the example configuration of a camera head separated type camera device according to Embodiment 1.

FIG. 1 illustrates the example configuration of a camera head separated type camera device according to Embodiment 1. The camera head separated type camera device 1 is configured so that a camera head 2 and a CCU 9 for controlling the camera head 2 are connected to each other by a camera cable 15.

An optical image of a subject incident on the camera head 2 through a lens (not shown) is formed on a light receiving plane of an image pickup element 3, for example, composed of a CMOS sensor, etc. The image pickup element 3 converts the optical image formed on the light receiving plane thereof into a corresponding video signal and outputs the video signal to an LVDS conversion driver 4.

The LVDS conversion driver 4 serializes the digital video signal output from the image pickup element 3 to convert into an LVDS signal and outputs the LVDS signal to the CCU 9 through the camera cable 15.

An LVDS control portion 5 performs adjustment of the voltage amplitude of the LVDS signal waveform and reinforcement of the rising (falling) portion of the LVDS signal waveform when the LVDS conversion driver 4 generates the LVDS signal. While the LVDS signal is transmitted in a small signal amplitude to achieve high-speed digital transmission, the voltage amplitude of the differential signal is further lowered because of a voltage drop due to the internal resistance of the cable 15, and the high-frequency component of video data is attenuated because of frequency characteristic, that is, the rising (falling) time of data is elongated. Therefore, adjustment of the voltage amplitude of the signal waveform and reinforcement of the rising (falling) portion of the signal waveform are performed in consideration of the influence of the cable 15. The type and size of adjustment are determined based on a correction value 17 fed from a correction control portion 6.

The correction control portion 6 calculates the voltage drop and outputs the correction value 17 of the LVDS signal fed to the LVDS control portion 5. The correction control portion 6 has a voltage measurement portion 7 which measures the voltage value of a DC voltage fed from the CCU 9, and a storage portion 8 which stores a correction value 17 preset based on the size of a voltage effect and the reproducing state of the CCU 9.

The voltage measurement portion 7 measures the voltage value of the DC voltage fed from the CCU 9 and calculates a voltage drop from a predetermined voltage value based on the measured voltage value. The storage portion 8 is an ROM (Read Only Memory) or a flash memory. The storage portion 8 stores a table 18 of correction values 17 of the LVDS signal to be fed to the LVDS control portion 5. The correction control portion 6 extracts a correction value 17 from the table 18 based on the voltage drop and feeds the correction value 17 to the LVDS control portion 5.

An LVDS receiver 10 of the CCU 9 receives the LVDS signal transmitted from the LVDS conversion driver 4 of the camera head 2, deserializer the differential serial signal and transmits the resulting signal to a signal processing portion 11.

The signal processing portion 11 performs various types of preset signal processing based on a control signal given from a control portion 14 and transmits the generated video signal to an output circuit 12. The output circuit 12 outputs the video signal to a display device, etc.

The control portion 14 has an MPU (Micro Processing Unit) and controls the LVDS receiver 10, the signal processing portion 11 and the output circuit 12 which are connected to the control portion 14 through a bus 13. The control portion 14 feeds a predetermined voltage to the correction control portion 6 of the camera head 2. The control portion 14 monitors whether the LVDS receiver 10 accurately latches the LVDS signal transmitted from the camera head 2 or not, and monitors whether the video signal is reproduced accurately or not.

Figure 2:
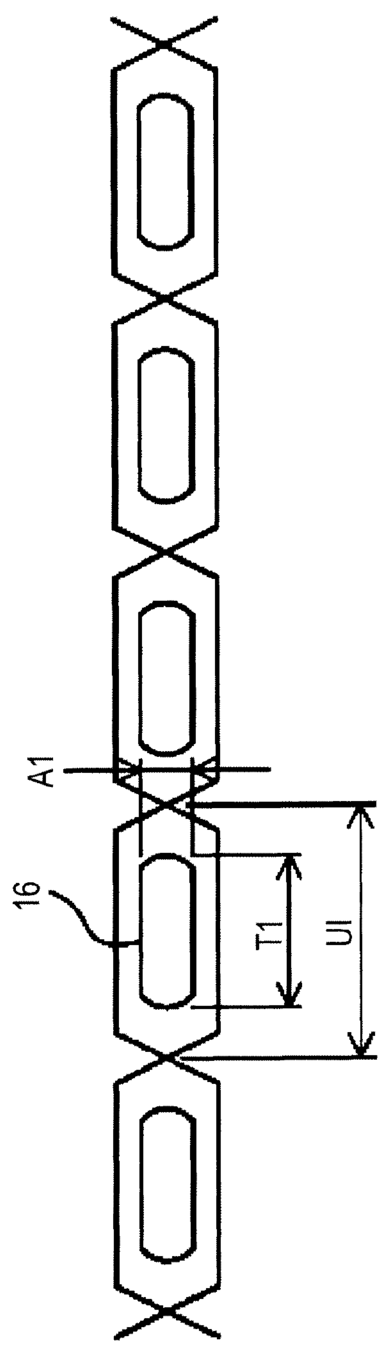
FIG. 2 exemplarily illustrates an eye mask for the waveform of an LVDS signal.

FIG. 2 exemplarily illustrates an eye mask for the LVDS signal waveform in a state in which the LVDS receiver 10 receives the LVDS signal. As the voltage drop in the cable 15 becomes large, t the amplitude of the differential signal becomes small, and the rising time and the falling time of the differential signal become long. Whether the CCU 9 satisfies the video signal reproducing condition can be determined with an eye mask 16 of 1 UI (Unit Interval) of the LVDS signal. When the waveform invades this region, there is a possibility that mistaken data will be reproduced because information cannot be latched accurately.

The eye mask 16 has a predetermined size represented by voltage amplitude A1 and time T1 as shown in FIG. 2. When the LVDS signal invades the eye mask 16, it will be difficult to reproduce video information. And, when the eye mask 16 in the LVDS receiver 10 is always larger than the eye mask 16, stable reproduction can be made.

The voltage drop due to the internal resistance of the cable 15 correlates with frequency characteristic. As the length of the cable becomes long, the voltage amplitude of the differential signal becomes low and the high-frequency component of data is attenuated in accordance with the frequency characteristic, that is, the rising (falling) time of data becomes so long that the waveform invades the eye mask 16. By examining the relation between the voltage drop in accordance with the cable length and the reproducing state in the manufacturing stage of the camera head 2 and the CCU 9 in the factory, it is possible to check whether the data producing state due to the length of the cable is good or not.

When the data reproducing state is worsened because of the large voltage drop, adjustment of the voltage amplitude of the signal waveform and reinforcement of the rising (falling) portion of the signal waveform can be performed on the LVDS signal generated by the LVDS conversion driver 4, thereby providing the LVDS signal as being not affected by the voltage drop to the LVDS receiver 10.

Figure 3:
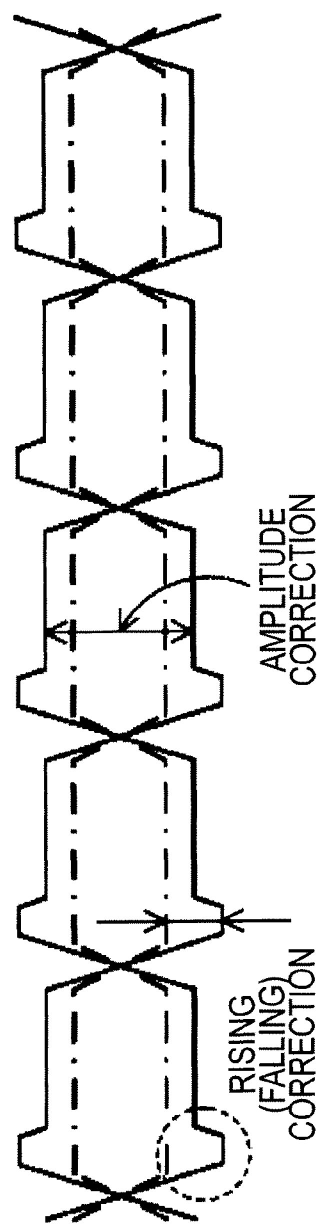
FIG. 3 exemplarily illustrates the LVDS waveform to which correction is applied.

FIG. 3 exemplarily illustrates the waveform obtained by applying correction to the LVDS waveform output from the LVDS conversion driver 4. The waveform represented by the one-dot chain line is a waveform before correction is applied. By applying rising (falling) correction, the waveform can be prevented from invading the eye mask.

When the cable length is so short that correction is not required, these corrections may not be applied. By applying the rising correction, undershoot may be produced in a last half of the rising correction to thereby cause disorder of the waveform. Further, by applying correction, the power consumption of the LVDS conversion driver 4 will be increased, and the influence of heating will be caused. Therefore, it is necessary to apply an appropriate correction value in accordance with the cable length.

FIG. 4 illustrates the table 18 indicating the relation between a voltage drop and each correction value. When the control portion 14 of the CCU 9 feeds a predetermined voltage, for example, Va to the correction control portion 6 of the camera head 2 and a voltage Vb is measured by the voltage measurement portion 7, the voltage drop Vc can be calculated as Vc=Va−Vb. By measuring the voltage drop and the reproducing condition while changing the length of the cable 15, correction values allowing the waveform to be reproduced accurately can be found to thereby create the table 18 as shown in FIG. 4. In the table 18, n amplitude correction values and n rising correction values correspond to n voltage drop values V1 to Vn. Information in the table 18 is stored in the storage portion 8 of the correction control portion 6 in the manufacturing stage.

Figure 5:
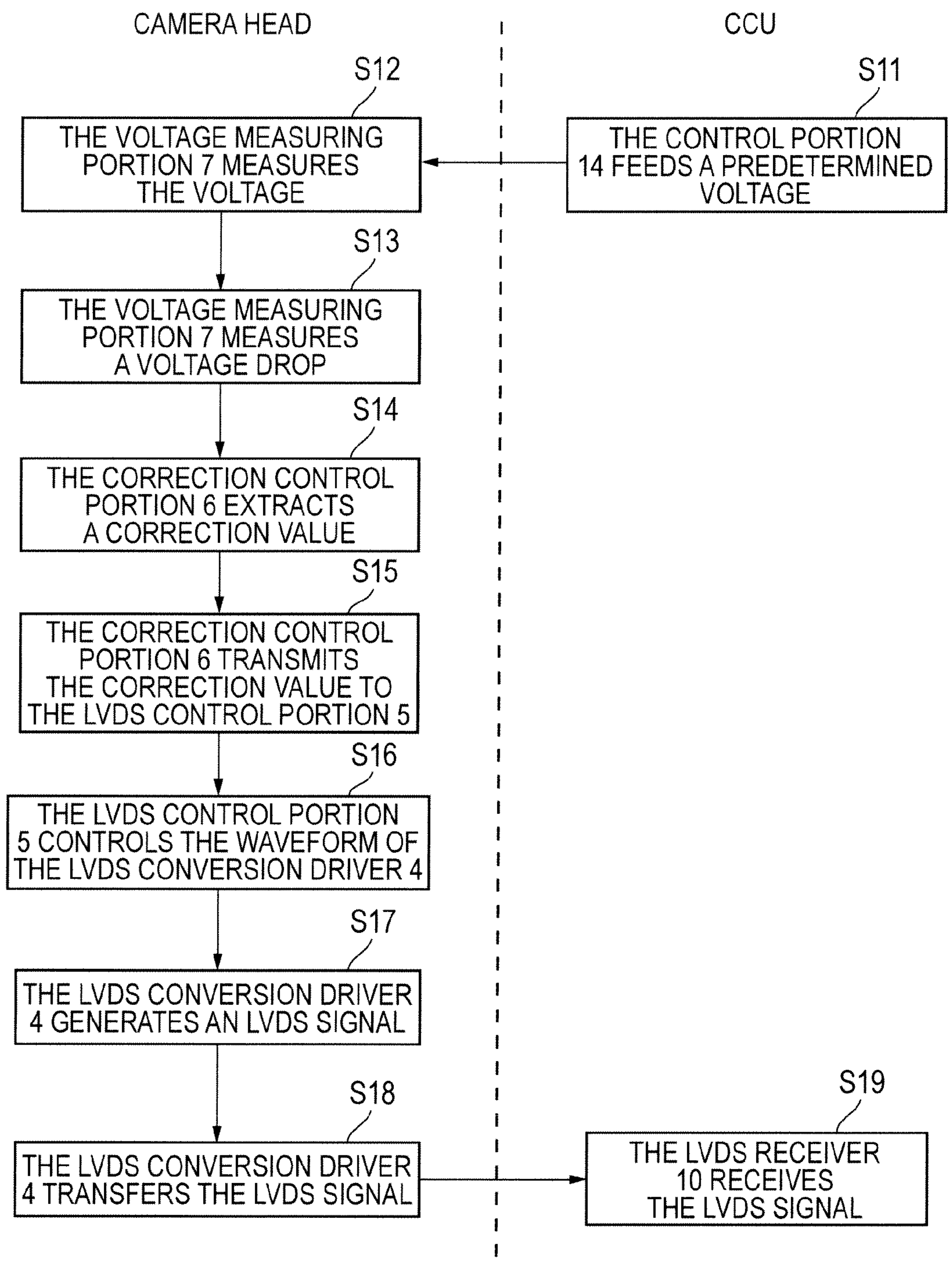
FIG. 5 illustrates the example operation of the camera head separated type camera device.

FIG. 5 illustrates the example operation of the camera head separated type camera device 1. When a user uses the camera head separated type camera device 1 in practice, a cable having an arbitrary length is used to connect the camera head 2 and the CCU 9 with each other.

In S11, after the CCU 9 is powered on, the control portion 14 of the CCU 9 feeds a predetermined voltage to the correction control portion 6 of the camera head 2. In S12, the voltage measurement portion 7 measures the voltage value. In S13, the voltage measurement portion 7 calculates the voltage drop from a predetermined voltage value based on the measured voltage value.

In S14, the correction control portion 6 extracts a correction value 17 from the table 18 of the storage portion 8 based on the voltage drop. The correction value 17 contains an amplitude correction value and a rising (falling) correction value. In the table 18 shown in FIG. 4, for example, when the voltage drop is not smaller than V1 and smaller than V2, A1 and E1 are extracted as the amplitude correction value and the rising correction value respectively.

In S15, the correction control portion 6 feeds the extracted correction value 17 to the LVDS control portion 5. In S16, the LVDS control portion 5 performs adjustment of the voltage amplitude of the LVDS signal waveform and reinforcement of the rising (falling) portion of the LVDS signal waveform based on the correction value 17 when the LVDS conversion driver 4 generates the LVDS signal.

In S17, the LVDS conversion driver 4 deserializes the digital video signal transmitted from the image pickup element 3 to generate the LVDS signal based on a control signal given from the LVDS control portion 5. In S18, the LVDS conversion driver 4 outputs the generated LVDS signal to the CCU 9 through the camera cable 15. In S19, the LVDS receiver 10 of the CCU 9 receives the LVDS signal.

As described above, the voltage measurement portion 7 measures the voltage drop due to the cable 15, the correction control portion 6 extracts a correction value 17 from the previously stored table 18 indicating the relation between a voltage drop and each correction value, the LVDS control portion 5 adjusts the LVDS signal waveform based on the correction value 17, and the LVDS conversion driver 4 generates and transmits the waveform-adjusted LVDS signal, so that the CCU 9 can reproduce the video signal accurately.

[Embodiment 2]

Figure 6:
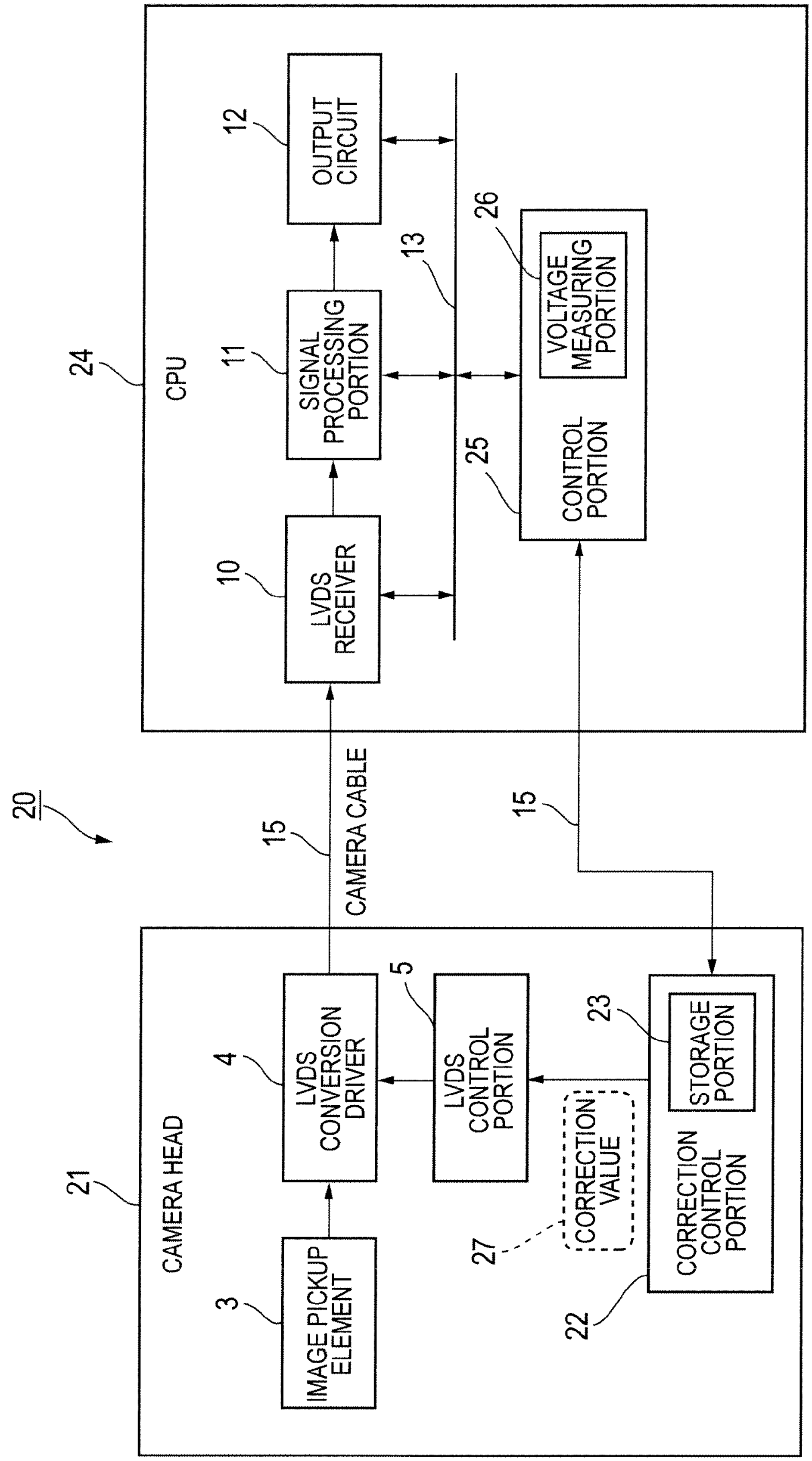
FIG. 6 illustrates the example configuration of a camera head separated type camera device according to Embodiment 2.

FIG. 6 illustrates the example configuration of a camera head separated type camera device 20 according to Embodiment 2. With respect to parts in Embodiment 2, the same parts as those in Embodiment 1 shown in FIG. 1 are referred to by the same numerals. The point of difference of Embodiment 2 from Embodiment 1 lies in that a camera head 21 does not measure the voltage drop and a CCU 24 has a voltage measurement portion 26 which measures the voltage value of a DC voltage fed from the camera head 21.

After the CCU 24 is powered on, a control portion 25 of the CCU 24 feeds a predetermined voltage to a correction control portion 22 of the camera head 21. The correction control portion 22 feeds the voltage value to the control portion 25 without adjustment of the voltage value fed from the CCU 24. The voltage measurement portion 26 in the control portion 25 measures the voltage value and calculates the voltage drop. Accordingly, the voltage drop is equivalent to a voltage drop caused by a round trip between opposite ends of the cable 15. The control portion 25 transmits the voltage drop to the correction control portion 22.

The correction control portion 22 extracts a correction value 27 from a table 28 of a storage portion 23 based on the voltage drop transmitted from the control portion 25. The correction value 27 contains an amplitude correction value and a rising correction value.

FIG. 7 illustrates the table 28 indicating the relation between the voltage drop and the correction value in Embodiment 2. For example, the control portion 25 of the CCU feeds a predetermined voltage Ve (for example) to the correction control portion 22 of the camera head 21, and the correction control portion 22 further feeds the predetermined voltage to the control portion 25. When a voltage Vf is measured by the voltage measurement portion 26, the voltage drop Vg can be calculated as Vg=Ve−Vf. By examining the relation between the voltage drop and the frequency characteristic while changing the length of the cable 15, a table indicating correspondence of the cable length and the reproducible correction value as shown in FIG. 7 can be created. In the table 28, n amplitude correction values and n rising correction values correspond to n voltage drop values Vs1 to Vsn respectively. Information in the table 28 is stored in the storage portion 23 of the correction control portion 22 in the manufacturing stage.

In the table 28 shown in FIG. 7, for example, when the voltage drop is Vs1, As1 and Es1 are extracted as the amplitude correction value and the rising correction value respectively. The correction control portion 22 transmits the extracted correction value 27 to the LVDS control portion 5.

As described above, the voltage measurement portion measures the voltage drop due to the cable 15 in transmission from the CCU 24 to the camera head 21 and further transmission from the camera head 21 to the CCU 24 and transmits the voltage drop to the correction control portion 22, the correction control portion 22 extracts a correction value 27 from the previously stored table 28 indicating the relation between the voltage drop and the correction value, the LVDS control portion 5 adjusts the LVDS signal waveform based on the correction value 27, the LVDS conversion driver 4 generates and transmits the waveform-adjusted LVDS signal, so that the CCU 24 can reproduce the video signal accurately.

[Embodiment 3]

Figure 8:
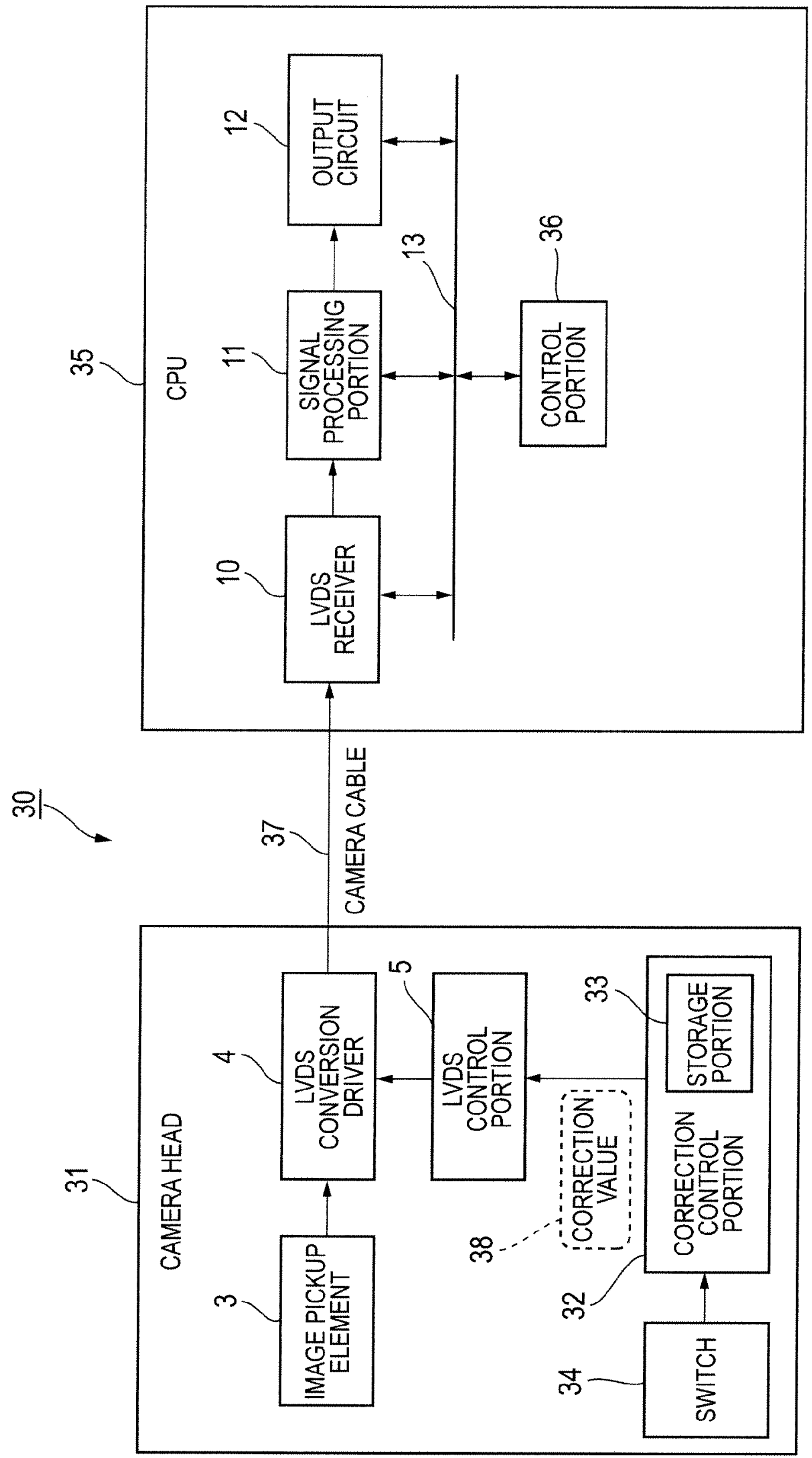
FIG. 8 illustrates the example configuration of a camera head separated type camera device according to Embodiment 3.

FIG. 8 illustrates the example configuration of a camera head separated type camera device 30 according to Embodiment 3. With respect to parts in Embodiment 3, the same parts as those in Embodiment 1 shown in FIG. 1 are referred to by the same numerals. The point of difference of Embodiment 3 from Embodiment 1 lies in that a camera head 31 does not measure the voltage drop but has a switch 34 for changing the correction value. The user can select the correction value in accordance with the length of a cable 37.

A correction control portion 32 outputs a correction value 38 set by the switch 34. The correction control portion 32 has a storage portion 33 which stores correction values 38 preset based on reproducing conditions of a CCU 35. The storage portion 33 is an ROM (Read Only Memory) or a flash memory. The storage portion 33 stores a table 39 of correction values 38 of the LVDS signal to be fed to the LVDS control portion 5. The correction control portion 32 extracts a correction value 38 set by the switch 34 from the table 39 and feeds the correction value 38 to the LVDS control portion 5.

A control portion 36 of the CCU 35 has an MPU and controls the LVDS receiver 10, the signal processing portion and the output circuit 12 which are connected to the control portion 36 through the bus 13. The control portion 36 monitors whether the LVDS receiver 10 accurately latches the LVDS signal transmitted from the camera head 31 or not, and monitors whether the video signal is reproduced accurately or not.

Figure 9:
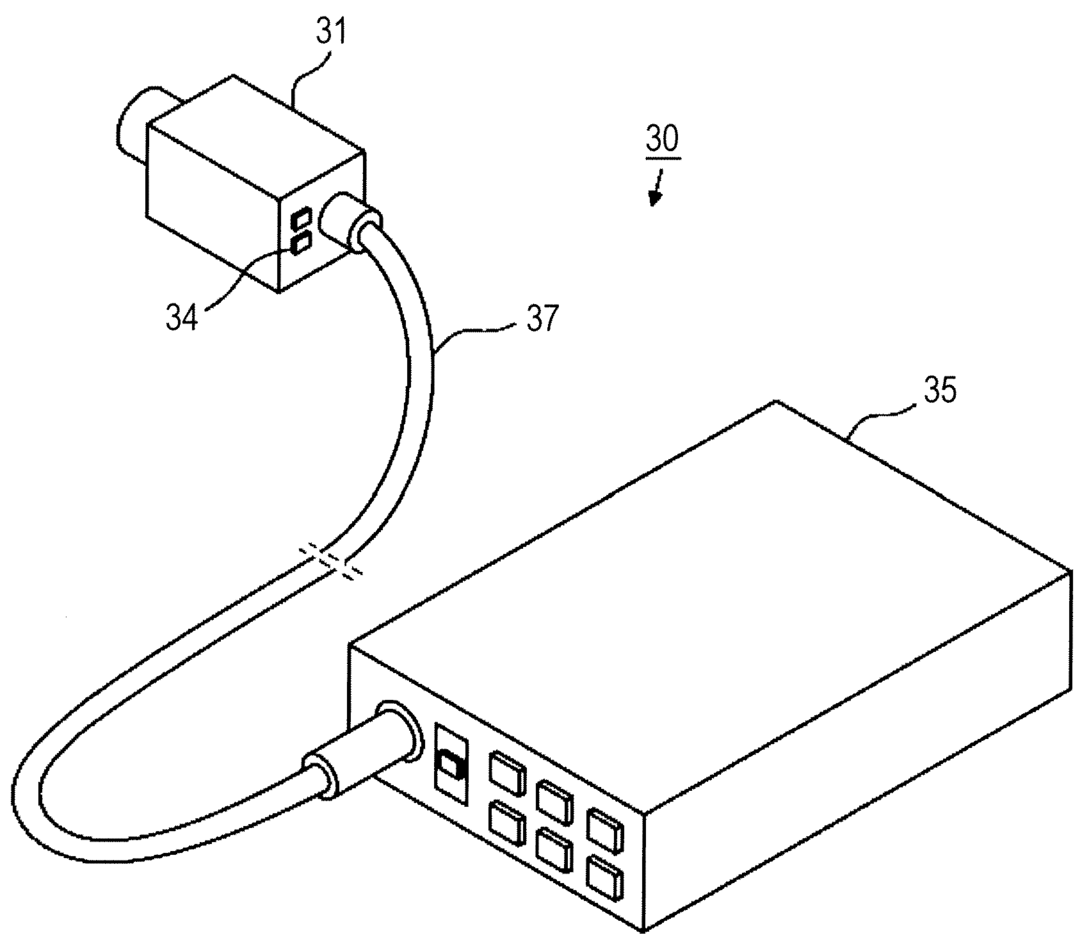
FIG. 9 illustrates the camera head separated type camera device according to Embodiment 3.

FIG. 9 illustrates the camera head separated type camera device 30 according to Embodiment 3. The switch 34 is provided on a housing of the camera head 31. When the user operates the switch 34, the user can select the correction value 38.

FIG. 10 illustrates the table 39 indicating the relation between the switch setting value and the correction value in Embodiment 3. By examining the relation between the cable length and the reproducing condition while changing the length of the cable 37, a table 39 indicating the relation between the switch setting value and the correction value can be created. In the table 39, n amplitude correction values and n rising correction values correspond to n setting values SW1 to SWn respectively. Information in the table 39 is stored in the storage portion 33 of the correction control portion 32 in the manufacturing stage.

In the table 39 shown in FIG. 10, for example, when the setting value of the switch is SW1, Asw1 and Esw1 are extracted as the amplitude correction value and the rising correction value respectively. The correction control portion transmits the extracted correction value 38 to the LVDS control portion 5.

As described above, the correction control portion 32 extracts a correction value 38 from the previously stored table 39 indicating the relation between the setting value of the switch 34 and the correction value 38, the LVDS control portion 5 adjusts the LVDS signal waveform based on the correction value 38, and the LVDS conversion driver 4 generates and transmits the waveform-adjusted LVDS signal, so that the CCU 35 can reproduce the video signal accurately.

[Embodiment 4]

Figure 11:
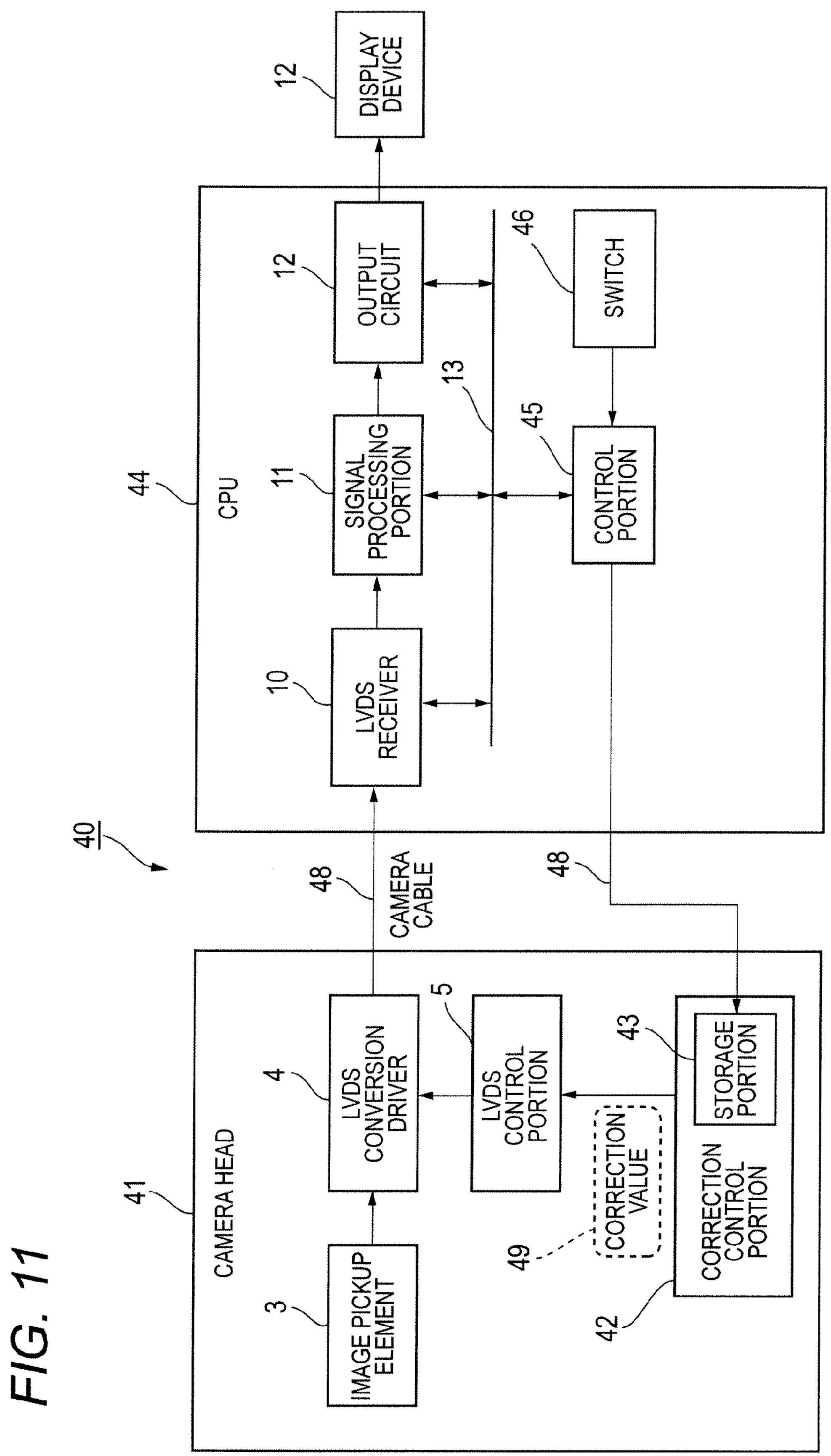
FIG. 11 illustrates the example configuration of a camera head separated type camera device according to Embodiment 4.

FIG. 11 illustrates the example configuration of a camera head separated type camera device 40 according to Embodiment 4. With respect to parts in Embodiment 4, the same parts as those in Embodiment 3 shown in FIG. 8 are referred to by the same numerals. The point of difference of Embodiment 4 from Embodiment 3 lies in that a switch 46 for changing the correction value is not provided on a camera head 41 but provided on a CCU 44 which has a control portion 45 which transmits the setting value of the switch 46 to a correction control portion 42 of the camera head 41. The user can select the correction value in accordance with the length of a cable 48.

The output circuit 12 of the CCU 44 outputs a video signal to a display device 47, so that the setting value of the switch 46 can be set while displayed on a screen of the display device 47 based on an OSD (On Screen Display) menu. Incidentally, the display device 47 may be disposed in the housing of the CCU 44 or may be provided as another external housing separated from the housing of the CCU 44.

The control portion 45 of the CCU 44 has an MPU and controls the LVDS receiver 10, the signal processing portion and the output circuit 12 which are connected to the control portion 45 through the bus 13. The control portion 45 monitors whether the LVDS receiver 10 accurately latches the LVDS signal transmitted from the camera head 41 or not, and monitors whether the video signal is reproduced accurately or not. The control portion 45 transmits the value set by the switch 46 to a correction control portion 42 of the camera head 41 through the cable 48.

The correction control portion 42 outputs a correction value 49 based on the setting value of the switch 46 transmitted from the control portion 45. The correction control portion 42 has a storage portion 43 which stores correction values 49 preset based on reproducing conditions of the CCU 44. The storage portion 43 is an ROM (Read Only Memory) or a flash memory. The storage portion 43 stores a table 50 of correction values 49 of the LVDS signal to be fed to the LVDS control portion 5. The correction control portion 42 extracts a correction value 49 from the table 50 and feeds the correction value 49 to the LVDS control portion 5.

Figure 12:
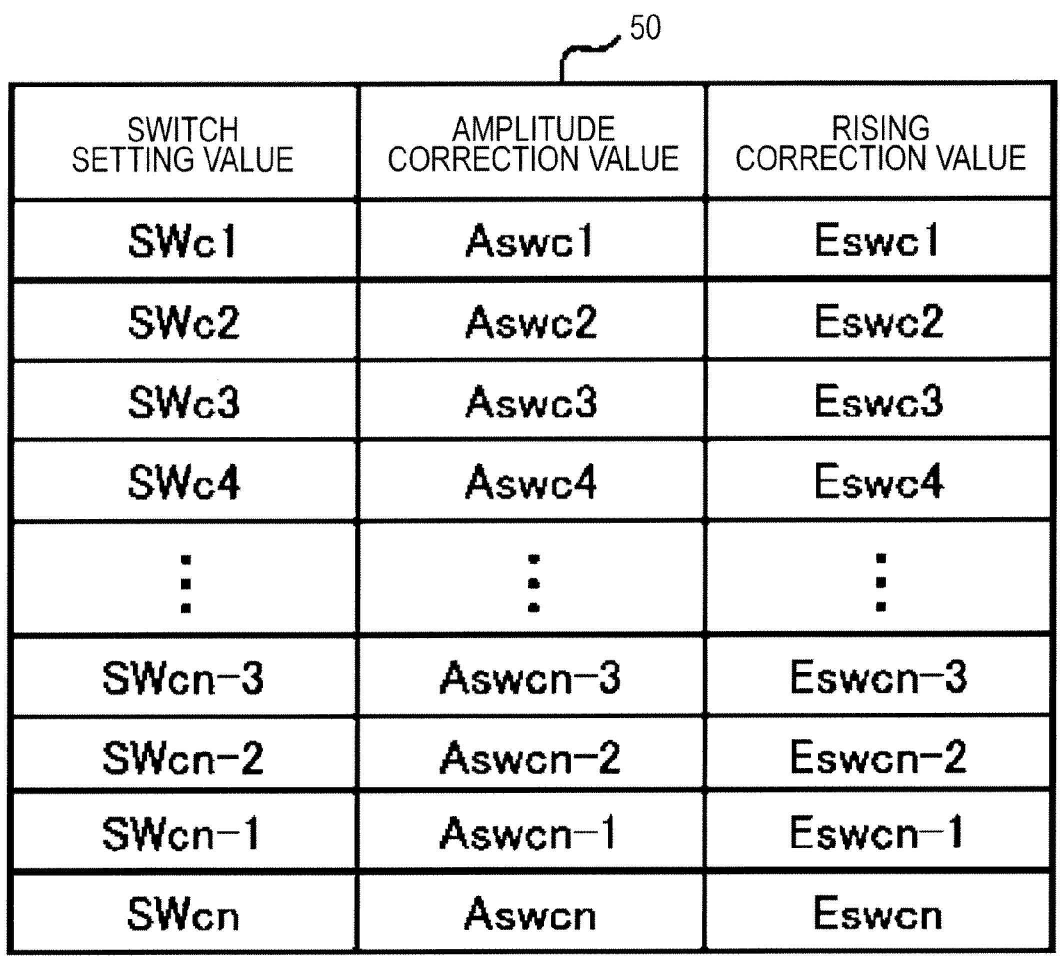
FIG. 12 illustrates an example table of the relation between a switch setting value and each correction value in Embodiment 4.
Figure 13:
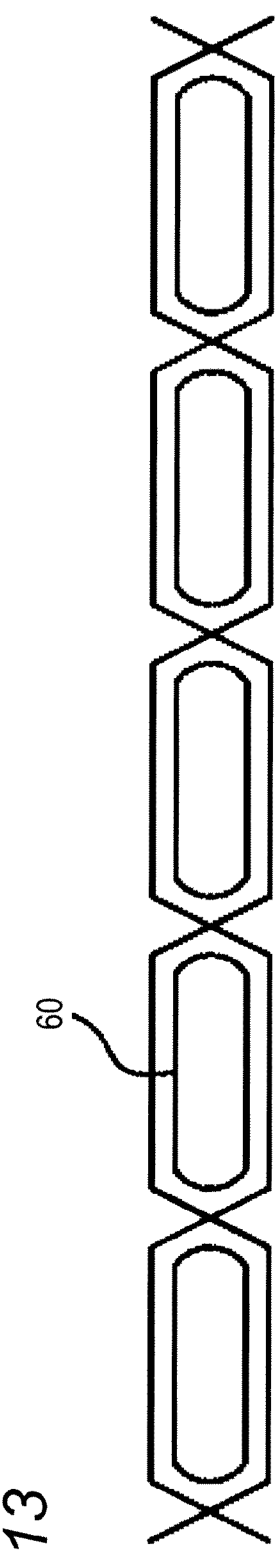
FIG. 13 illustrates the example waveform of a good quality LVDS signal.
Figure 14:
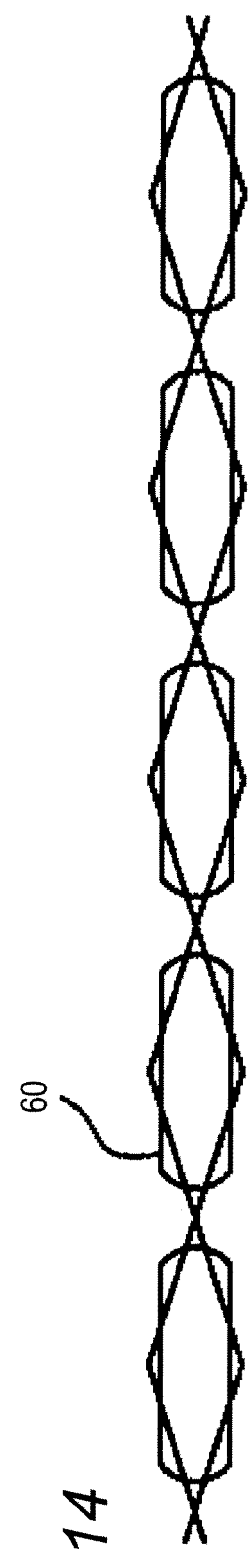
FIG. 14 illustrates the example waveform of a poor quality LVDS signal.

FIG. 12 illustrates the table 50 indicating the relation between the switch setting value and the correction value in Embodiment 4. By examining the relation between the cable length and the reproducing condition while changing the length of the cable 48, a table 50 indicating the relation between the switch setting value and the correction value can be created. In the table 50, n amplitude correction values and n rising correction values correspond to n setting values SWc1 to SWcn respectively. Information in the table 50 is stored in the storage portion 43 of the correction control portion 42 in the manufacturing stage.

In the table 50 shown in FIG. 12, for example, when the setting value of the switch is SWc1, Aswc1 and Eswc1 are extracted as the amplitude correction value and the rising correction value respectively. The correction control portion 42 transmits the extracted correction value 49 to the LVDS control portion 5.

As described above, the correction control portion 42 receives the value set by the switch 46 of the CCU 44 from the control portion 45 and extracts a correction value 49 from the previously stored table 50 indicating the relation between the setting value of the switch 46 and the correction value 49, the LVDS control portion 5 adjusts the LVDS signal waveform based on the correction value 49, and the LVDS conversion driver 4 generates and transmits the waveform-adjusted LVDS signal, so that the CCU 44 can reproduce the video signal accurately.

[Embodiment 5]

In the example configuration of the camera head separated type camera device 40 shown in FIG. 11, the control portion 45 monitors whether the LVDS receiver 10 accurately latches the LVDS signal transmitted from the camera head 41 or not, and monitors whether the video signal is reproduced accurately or not. And, when the LVDS receiver 10 cannot latch the LVDS signal accurately or when the video signal cannot be reproduced accurately, the control portion 45 reboots the camera head 41.

When the camera head 41 is rebooted, the control portion 45 changes the correction value 49. For example, in the table 50 shown in FIG. 12, the correction value 49 is changed to a larger value so that the setting value is changed from SWc1 to SWc2, the amplitude correction value is changed from Aswc1 to Aswc2 and the rising correction value is changed from Eswc1 to Eswc2. The control portion 45 repeats the reboot unless the LVDS receiver 10 can accurately latch the LVDS signal transmitted from the camera head 41 or unless the video signal can be reproduced accurately. In this manner, the CCU 44 can reproduce the video signal accurately.

The invention is not limited to the aforementioned embodiments directly but constituent members may be modified and put into practice without departing from the gist of the invention in a practical stage. Constituent members in the aforementioned embodiments may be combined suitably to form various inventions. For example, some of all constituent members disclosed in one of the embodiments may be removed. In addition, constituent members disclosed in different embodiments may be combined suitably.

According to an aspect of the invention, it is possible to provide a camera head separated type camera device in which an LVDS signal can be transmitted stably from a camera head to a CCU regardless of the length of a cable so that a stable video output can be obtained.

What is claimed is:

1. A camera head separated type camera device, in which a camera head and a camera control unit are connected by a cable, wherein the camera control unit includes:

a control module configured to transfer a predetermined Direct Current (DC) voltage to a correction control module of the camera head; and a voltage measurement module configured to measure a voltage drop in the DC voltage which has been transferred from the correction control module without any processing, and wherein the camera head includes:

a Low Voltage Differential Signaling (LVDS) conversion driver module configured to transmit a LVDS signal to the camera control unit;

the correction control module configured to generate an amplitude correction value and a rising correction value based on the voltage drop in the DC voltage measured by the voltage measurement module; and a LVDS control module configured to control the LVDS conversion driver module based on the amplitude correction value and the rising correction value generated by the correction control module.

2. The camera device of claim 1, wherein the correction control module includes:

a storage module configured to store the voltage drop transmitted without any processing by the correction control module and the amplitude correction value and the rising correction value for the LVDS signal to be supplied to the LVDS control module.

3. A camera head separated type camera device, in which a camera head and a camera control unit are connected by a cable, wherein the camera head or the camera control unit includes:

a switch configured to change an amplitude correction value and a rising correction value, wherein the camera head includes:

a Low Voltage Differential Signaling (LVDS) conversion driver module configured to transmit a LVDS signal to a correction control module of the camera control unit;

a correction control module configured to output the amplitude correction value and the rising correction by changing them through a selection of the switch; and a LVDS control module configured to control the LVDS conversion driver module based on the amplitude correction value and the rising correction value changed by the correction control module.

4. The camera device of claim 3, wherein the correction control module includes:

a storage module configured to store the amplitude correction value and the rising correction value which have been preset based on a length of the cable and a reproducing state in the camera control unit.

5. The camera device of claim 3, wherein the switch is provided in the camera head.

6. The camera device of claim 3, wherein the switch is provided in the camera control unit.

7. The camera device of claim 3, further comprising:

wherein the camera control unit includes:

an output circuit configured to display, on an external display device, information of the amplitude correction value and the rising correction value.

8. A control method for a camera head separated type camera device, in which a camera head and a camera control unit are connected by a cable, the method comprising:

transferring, with the camera control unit, a predetermined Direct Current (DC) voltage to a correction control module of the camera head;

transmitting, with a Low Voltage Differential Signaling (LVDS) conversion driver module of the camera head, a LVDS signal to the camera control unit;

generating, with the correction control module, an amplitude correction value and a rising correction value based on a voltage drop in the DC voltage which has been transferred from the correction control module without any processing, the voltage drop having been measured with a voltage measurement module; and controlling, with a LVDS control module, the LVDS conversion driver module.

9. A camera head separated type camera device, in which a camera head and a camera control unit are connected by a cable, wherein the camera control unit includes:

a control module configured to transfer a predetermined Direct Current (DC) voltage to a correction control module of the camera head, and wherein the camera head includes:

a Low Voltage Differential Signaling (LVDS) conversion driver module configured to transmit a LVDS signal to the camera control unit;

a voltage measurement module included in the correction control module and configured to measure a voltage drop in the DC voltage transferred to the correction control module;

the correction control module configured to generate an amplitude correction value and a rising correction value based on the voltage drop in the DC voltage measured by the voltage measurement module; and a LVDS control module configured to control the LVDS conversion driver module based on the amplitude correction value and the rising correction value generated by the correction control module.

10. The camera device of claim 9, wherein the correction control module includes:

a storage module configured to store the voltage drop and the amplitude correction value and the rising correction value for the LVDS signal to be supplied to the LVDS control module.

* * * * *